Patented May 27, 1941

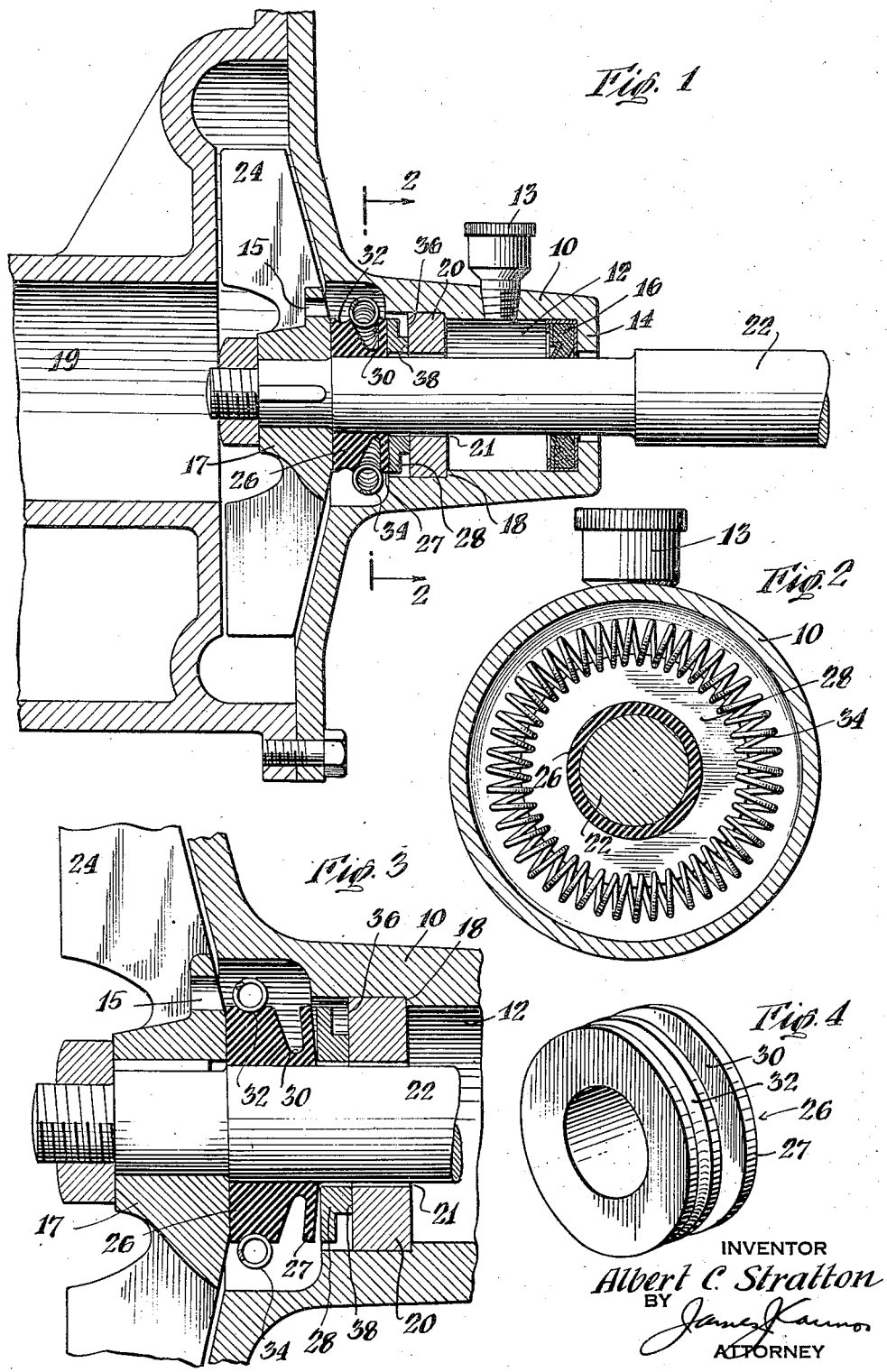

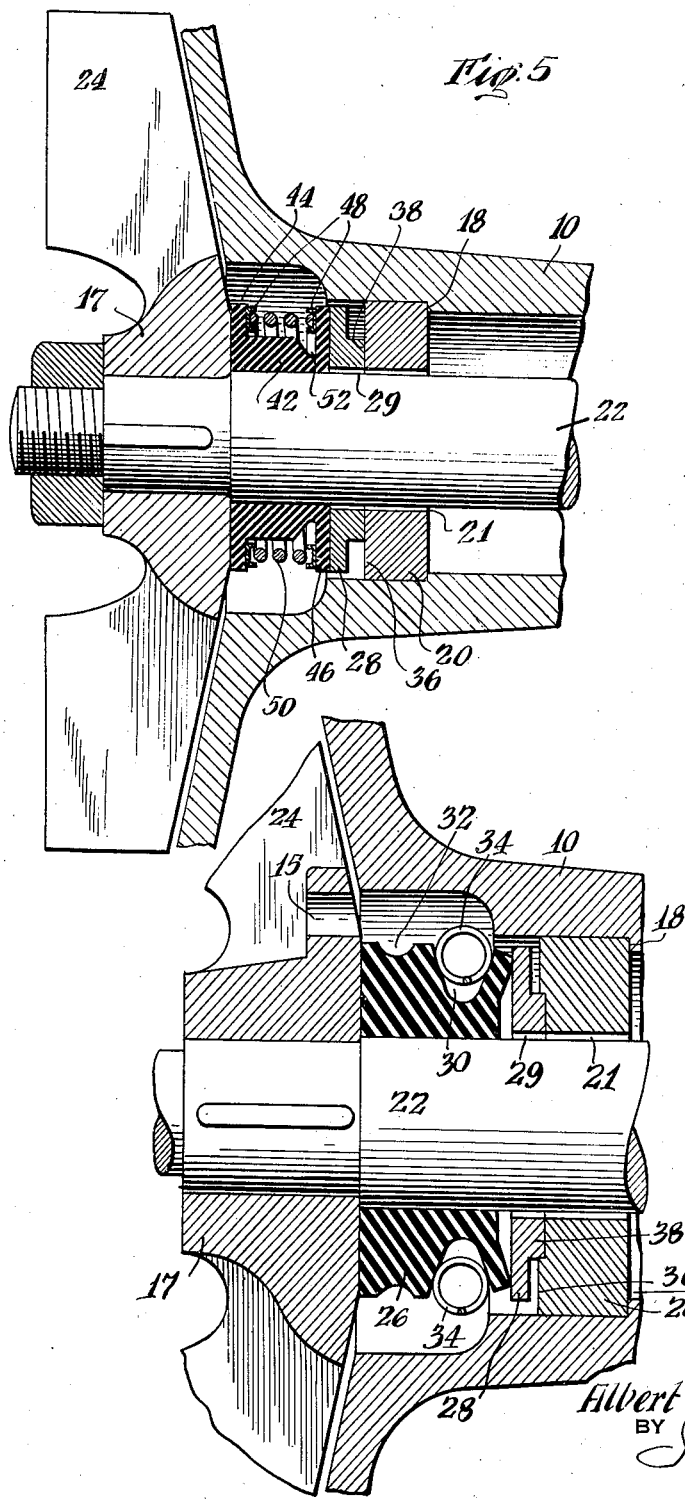

2,243,227

UNITED STATES PATENT OFFICE 2,243,227

SHAFT SEALING MEANS

Albert C. Stratton, Ridgewood, N. J., assignor to Alfred S. Marlow, Ridgewood, N. J.

Application August 6, 1938, Serial No. 223,391
In Great Britain July 19, 1938

4 Claims. (Cl. 286—7)

My invention relates to improvements in a sealing means for all types of pumps having a rotating shaft which must be sealed against the admission of air or gas to the pump interior and against outward leakage of water or fluid from the pump interior. The objects of my invention are to provide a seal which will at all times maintain a partial or a substantially perfect vacuum within the pump case. The second object of my invention is to provide an adequate seal against the outward flow of water or fluid from the pump case. The third object of my invention is to keep all water or other liquids or fluids being pumped away from contact with pump drive shaft thus preventing corrosion of the shaft. A fourth object of my invention is to maintain at all times a fixed maximum pressure at the sealing surface, which will not be overloaded by pressure or vacuum condition within the pump to cause undue wear on the sealing surfaces. A fifth object of my invention is to provide lubrication to the sealing surfaces from the inside adjacent to shaft so that centrifugal force of the rotating element maintains an adequate lubricating film. A sixth object of my invention is to provide means whereby the liquid to be pumped contacts the outer periphery of the sealing surfaces only so that the centrifugal force of the rotating element throws the liquid away from the sealing surface. A seventh object of my invention is to prevent and to have no wear on the pump shaft. An eighth object of my invention is to be able to maintain at all times a maximum automatic adjustment to take up wear of the sealing surface. A ninth object of my invention is the perfect ease of assembly and simplicity of parts.

These desirable objectives, some of which have been accomplished singly by different structures, have not heretofore been attained by simple means as embodied in my invention.

While my invention is applicable to all types of pumps having rotary shafts, it is particularly applicable to so called self-priming centrifugal pumps as described in my Patents #2,059,288 and #2,100,365 respectively.

One form of my invention is illustrated in the accompanying drawings in which Figure 1 shows a partial assembly of pump in cross section. Figure 2 shows a cross section on line 2—2 of Figure 1. Figure 3 is a fragmentary cross section showing the unit in a preassembled condition. Figure 4 is a detailed perspective view of the sealing member. Figure 5 is a cross section of a modified form of assembly. Fig. 6 is an enlarged fragmentary sectional view of the device illustrated in Fig. 1.

Reading on Figure 1 to 4 inclusive, of my sealing means, it consists of a stationary housing 10, forming a recess chamber 12, an end wall 14, a lubricant retainer 16, a shoulder 18 provided in housing 10 to receive a collar 20. A rotating impeller shaft 22 suitably supported by conventional bearings (not shown), carrying impeller 24 having a collar of oil proof rubber or other suitable resilient and flexible material 26 fitting tightly on shaft 22 bearing against the seat of sealing disc 28. The flexible collar 26 is provided with groove 30 around which an endless belt spring 34 is placed, when ready for operation. Said flexible collar 26 has a further groove 32 into which the spring is placed for ease of assembly. There is a clearance 21 between the collar 20 and the impeller shaft 22. There is also a clearance 29 between the sealing disc 28 and the impeller shaft 22. Chamber 12 is filled with grease or other lubricant provided from the cup 13.

In operation, the shaft 22, impeller 24, and tight fitting collar 26 are rotated within the housing 10, causing the pump to operate and thereby develop a partial vacuum within the pump case 19. Due to this vacuum air will tend to enter the pump case 19 along the shaft through the lubricant retainer 16 or lubricant reservoir 12, through clearance 21 and 29, and between the sealing surfaces 36 and 38 of the contacting collars 20 and 28. To overcome this the collars are held in close bearing contact by the action of collar 26 and belt spring 34. It will be seen that the action of the belt spring 34 which is wrapped in the V groove 30 will tend to distort the flange 27 of collar 26 into the position shown by Figure 10. This action causes a lateral pressure sufficient to keep the sealing surfaces 36 and 38 in contact.

As is common knowledge a perfect vacuum is equivalent to 14.7 pounds per square inch at sea level. Therefore it will be seen that when the pump is developing a substantially perfect vacuum the maximum pressure required to hold the sealing surfaces together will be a pressure only slightly greater than 14.7 pounds per square inch effective on the contacting area of the sealing surfaces. The wedge action of the belt spring in the V groove of collar 26 is arranged to provide the necessary pressure to hold the sealing surfaces 36 and 38 in sealing contact. Further it will be evident that the effect of the vacuum within pump case 19 reduces the load on the sealing surfaces and thus reduces wear. Examination of Figure 1 shows that the contracting belt spring will enter deeper into the V groove 30, causing a lateral movement of sealing disc 28 to take up wear on surfaces 36 and 38 as it occurs.

It will be noted here that the disc 28 is caused to rotate by friction between the flange 27 of collar 26 and disc 28, this driving force being exerted at the outer periphery of disc 28 and also forming a tight friction seal between collar 26 and disc 28.

Lubrication is supplied to the sealing surface from chamber 12 through clearance 21 and 29 and enters the sealing surfaces 36 and 38 from the surface of the shaft and is thrown outward by centrifugal force thus insuring adequate lubrication at all times.

Examination of the embodiment here shown will disclose that the liquid being pumped cannot reach the shaft to cause corrosion and that there are no parts contacting the shaft to cause wear as is common in many of the devices heretofore used. Further the liquid to be pumped contacts only the outer periphery of the sealing surface and again the centrifugal force of the rotating disc 28 prevents sand and debris that might be present in the liquid pumped from entering between the sealing surfaces.

All of the few parts here required may be constructed of readily obtainable material, and do not require extreme accuracy of manufacture which results in low cost of production. Assembly of the entire sealing unit is accomplished from the impeller side in the following manner. Collar 20 is secured in housing 16, shaft 22 inserted through collar 20 and secured in suitable bearings (not shown), sealing disc 28 is slipped over shaft 22 into contact with collar 20, flexible collar 26 is then assembled with belt spring 34 in groove 30 and is pressed on shaft 22 into contact with sealing disc 28. The impeller 24 is then placed and secured on shaft 22. The last operation of assembly is to insert a tool, through port 15 in impeller hub 17 to move belt spring 34 from groove 30 into V groove 32, this operation applying the lateral force to hold disc 28 in sealing contact with collar 20. Thus ease of assembly and replacement are accomplished which are important consideration in manufacture and maintenance.

Instead of using belt spring 34, a solid circumferential rubber band may be substituted in its place.

Reading on Figure 5 which is a cross section of a modified form of assembly, one of its differences over Figure 1 is the shape of the rubber collar which is designated in this modified form as 42. In this case it is not necessary to adjust the pressure on said rubber collar 42 after assembly of the unit as the coil spring 50, resting in metal cups 48, located between flanges 44 and 46 of said rubber collar 42, has a predetermined pressure acting against said flange 46 of said rubber collar 42 and also against sealing member 28, respectively.

Figure 6 is a fragmentary section showing the self adjusting feature of the sealing device as illustrated in Figure 1, showing that if the face wears the spring drops lower in the V shape slot, thus keeping a firm contact with collar 28.

While my shaft sealing means is particularly adaptable for many types of pumps and compressors, it may have many other uses not particularly described, or set forth herein, or shown in Figures 1 to 10 inclusive, as for example, my sealing means may be used for sealing rotating shafts entering vats or containers of any type where an adequate seal is required.

While I have illustrated my invention in different ways and using different materials and means still I do not intend to limit myself to those particular means, designs, methods or materials, as it is apparent that other means, designs, methods, and materials may be employed for obtaining the same results within the scope of any claim without departing from the scope or spirit of my invention.

What I claim is:

1. A sealing means about a rotating pump shaft, as herein described, comprising in combination a closed casing having a sub-atmospheric interior pressure, a chamber closing wall about said shaft, a fixed annular sealing ring positioned in said chamber closing wall, and having a clearance space about said shaft, a mating metallic sealing ring having a raised sealing surface of smaller diameter than the diameter of said ring, held in sealing contact with said fixed ring and caused to rotate with said shaft by a flexible resilient collar tightly fitting said shaft, and having a V shaped groove formed adjacent one end of said resilient collar, said V groove fitted with a garter spring to urge an annular portion of said resilient collar laterally for holding said sealing surfaces closely together, a second chamber containing a sealing and lubricating fluid located about said shaft on the atmospheric side of said sealing surfaces whereby atmospheric pressure forces said sealing and lubricating fluid through said clearance to the inner periphery of said sealing surface, said sealing and lubricating fluid thereupon being distributed by centrifugal force across the face of said sealing surfaces to effect a substantially perfect seal against the admission of atmospheric pressure into said casing.

2. A sealing means about a rotating pump shaft, as herein described, comprising in combination a closed casing having within said casing a sub-exterior pressure, a chamber closing wall about said shaft, a fixed annular sealing ring positioned in said chamber wall, and having a clearance space about said shaft, a mating metallic sealing ring having a raised sealing surface of smaller diameter than the diameter of said ring, held in sealing contact with said fixed ring and caused to rotate with said shaft by a flexible resilient collar tightly fitting said shaft, and having a V shaped groove formed adjacent one end of said resilient collar, said V groove fitted with a garter spring to urge an annular portion of said resilient collar laterally for holding said sealing surfaces closely together, a second chamber containing a sealing and lubricating fluid located about said shaft and in communication with a pressure in excess of the pressure existing within said casing, said larger pressure forcing said sealing and lubricating fluid through said clearance to the inner periphery of said sealing surface, said sealing and lubricating fluid thereupon being distributed by centrifugal force across the face of said sealing surfaces to effect a substantially perfect seal against the admission of air into said casing.

3. A sealing means about a rotating pump shaft, as herein described, comprising in combination a closed casing having a sub-atmospheric interior pressure, a chamber closing wall about said shaft, a fixed annular sealing ring positioned in said chamber wall, and having a clearance space about said shaft, a mating metallic sealing ring having a raised sealing surface of smaller diameter than the diameter of said ring, held in sealing contact with said fixed ring and caused to rotate with said shaft by a flexible resilient collar tightly fitting said shaft, and having about the body of said resilient collar a coil compression spring to urge an annular portion of said resilient collar laterally for holding said sealing surfaces closely together, a second chamber containing a sealing and lubricating fluid located about said shaft on the atmospheric side of said sealing surfaces, whereby atmospheric pressure forces said sealing and lubricating fluid through said clearance to the inner periphery of said sealing surface, said sealing and lubricating fluid thereupon being distributed by centrifugal force across the face of said sealing surfaces to effect a substantially perfect seal against the admission of atmospheric pressure into said casing.

4. A sealing means about a rotating pump shaft, as herein described, comprising in combination a closed casing having within said casing a sub-exterior pressure, a chamber closing wall about said shaft, a fixed annular sealing ring positioned in said chamber wall, and having a clearance space about said shaft, a mating metallic sealing ring having a raised sealing surface of smaller diameter than the diameter of said ring held in sealing contact with said fixed ring and caused to rotate with said shaft by a flexible resilient collar tightly fitting said shaft, and having about the body of said resilient collar a coil compression spring to urge an annular portion of said resilient collar laterally for holding said sealing surfaces closely together, a second chamber containing a sealing and lubricating fluid located about said shaft and in communication with a pressure in excess of the pressure existing within said casing, said larger pressure forcing said sealing and lubricating fluid through said clearance to the inner periphery of said sealing surface, said sealing and lubricating fluid thereupon being distributed by centrifugal force across the face of said sealing surfaces to effect a substantially perfect seal against the admission of air into said casing.

ALBERT C. STRATTON.